United States Patent [19]
Foye

[11] Patent Number: 6,000,224
[45] Date of Patent: Dec. 14, 1999

[54] TRAVEL MUG

[76] Inventor: Matthew R. Foye, 14 Lois St., Middleborough, Mass. 02346-2817

[21] Appl. No.: 09/036,433

[22] Filed: Mar. 5, 1998

[51] Int. Cl.[6] .................................................... F25B 21/02
[52] U.S. Cl. ........................ 62/3.2; 362/3.62; 362/457.9
[58] Field of Search ........................... 62/3.2, 3.3, 457.9, 62/3.62; 219/438

[56] References Cited

U.S. PATENT DOCUMENTS

| | | | |
|---|---|---|---|
| 3,813,517 | 5/1974 | McGruder | 219/405 |
| 4,801,782 | 1/1989 | Ineson | 219/438 |
| 5,042,258 | 8/1991 | Sundhar | 62/3.2 |

*Primary Examiner*—Henry Bennett
*Assistant Examiner*—Melvin Jones

[57] ABSTRACT

A heated and cooled beverage container is provided including a housing with a base having a peripheral side wall integrally coupled to a periphery of the base and extending upwardly therefrom for defining an interior space and an upper peripheral edge. Also included is a heating and cooling mechanism situated in communication with the housing and having a first mode for generating heat for heating contents of the housing and a second mode for absorbing heat for cooling the contents of the housing.

9 Claims, 2 Drawing Sheets

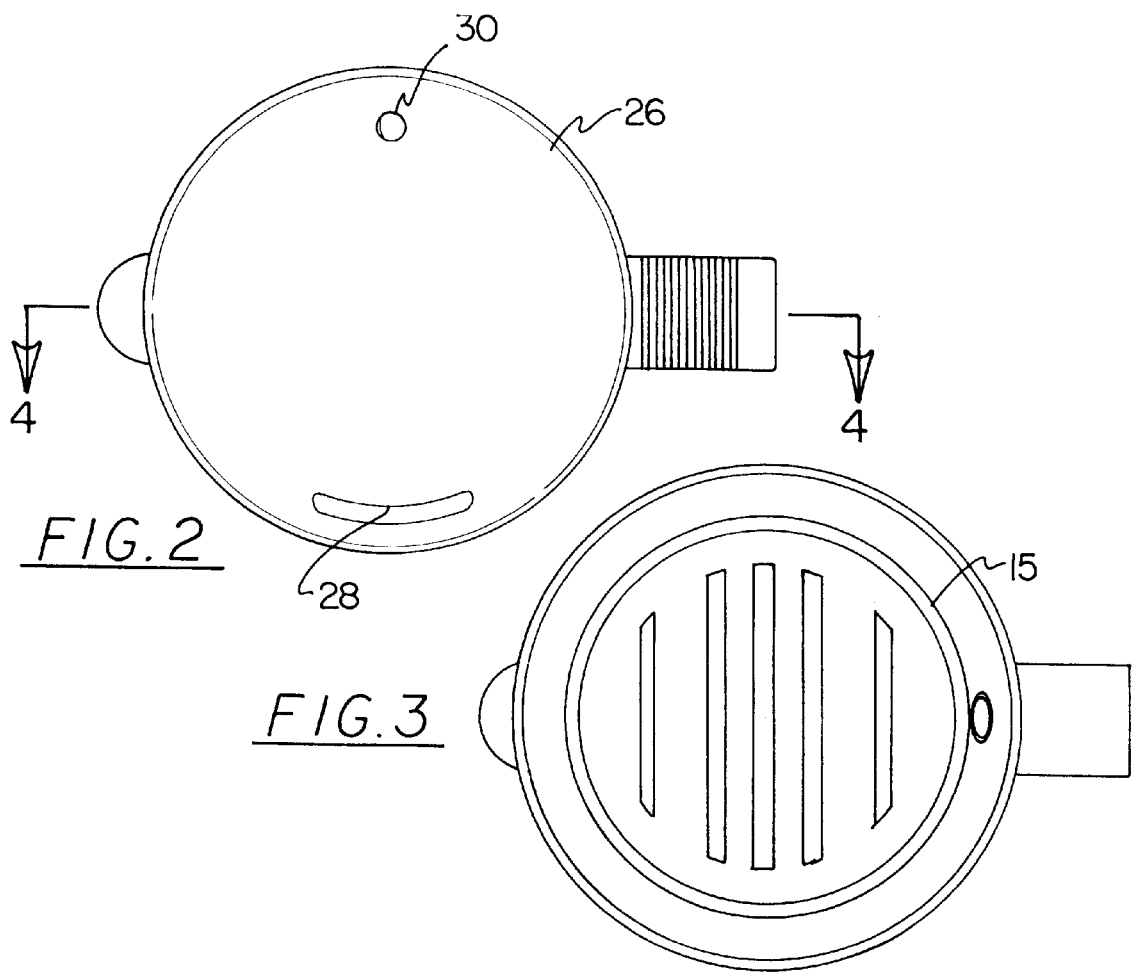
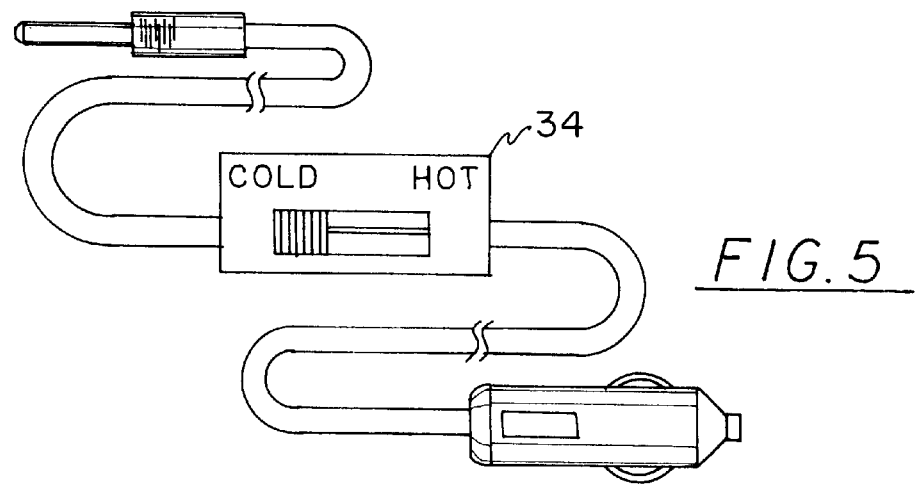

TRAVEL MUG

BACKGROUND OF THE INVENTION

1. Field of the Invention

The present invention relates to heated mugs and more particularly pertains to a new travel mug for both heating or cooling a beverage.

2. Description of the Prior Art

The use of heated mugs is known in the prior art. More specifically, heated mugs heretofore devised and utilized are known to consist basically of familiar, expected and obvious structural configurations, notwithstanding the myriad of designs encompassed by the crowded prior art which have been developed for the fulfillment of countless objectives and requirements.

Known prior art heated mugs include U. S. Pat. Nos. 4,052,590; 4,801,782; 5,243,684; Des. 243,498; and Des. 333,756

In these respects, the travel mug according to the present invention substantially departs from the conventional concepts and designs of the prior art, and in so doing provides an apparatus primarily developed for the purpose of both heating or cooling a beverage.

SUMMARY OF THE INVENTION

In view of the foregoing disadvantages inherent in the known types of heated mugs now present in the prior art, the present invention provides a new travel mug construction wherein the same can be utilized for both heating or cooling a beverage.

The general purpose of the present invention, which will be described subsequently in greater detail, is to provide a new travel mug apparatus and method which has many of the advantages of the heated mugs mentioned heretofore and many novel features that result in a new travel mug which is not anticipated, rendered obvious, suggested, or even implied by any of the prior art heated mugs, either alone or in any combination thereof.

To attain this, the present invention generally comprises a housing having a circular base with a peripheral side wall integrally coupled to a periphery of the base and extending upwardly therefrom. As such, an interior space and an upper peripheral edge is defined. The housing further includes a horizontally oriented intermediate face mounted to the side wall above and in parallel with the base for defining a compartment. It should be noted that an interior space of the housing is sized to releasably and fittedly receive a cylindrical can therein. Further provided is a handle including a pair of horizontally oriented arms integrally coupled to the side wall and extending radially therefrom. A vertical extent of the handle is coupled between outboard ends of the arms. An inner edge of the vertical extent has a plurality of undulations formed therein. A top edge of an upper one of the arms has a plurality of gripping ridges formed therein. Also included is a cap having a circular planar configuration with a pair of downwardly extending peripheral annular flanges for defining an annular groove. Such groove is adapted for releasably engaging the upper peripheral edge of the housing. A periphery of the cap has a tab integrally coupled thereto and extending radially therefrom for facilitating the removal of the cap from the housing. The cap has an arcuate slot formed therein adjacent to the periphery thereof. A circular breathing aperture is formed adjacent to the periphery on a diametrically opposed portion of the cap with respect to the arcuate slot. Finally, a heating and cooling means is situated within the compartment of the housing. During use, the heating and cooling means has a first mode for generating heat for heating contents of the housing and a second mode for absorbing heat for cooling the contents of the housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new travel mug apparatus and method which has many of the advantages of the heated mugs mentioned heretofore and many novel features that result in a new travel mug which is not anticipated, rendered obvious, suggested, or even implied by any of the prior art heated mugs, either alone or in any combination thereof.

It is another object of the present invention to provide a new travel mug which may be easily and efficiently manufactured and marketed.

It is a further object of the present invention to provide a new travel mug which is of a durable and reliable construction.

An even further object of the present invention is to provide a new travel mug which is susceptible of a low cost of manufacture with regard to both materials and labor, and which accordingly is then susceptible of low prices of sale to the consuming public, thereby making such travel mug economically available to the buying public.

Still yet another object of the present invention is to provide a new travel mug which provides in the apparatuses and methods of the prior art some of the advantages thereof, while simultaneously overcoming some of the disadvantages normally associated therewith.

Still another object of the present invention is to provide a new travel mug for both heating or cooling a beverage.

Even still another object of the present invention is to provide a new travel mug that includes a housing with a base having a peripheral side wall integrally coupled to a periphery of the base and extending upwardly therefrom for defining an interior space and an upper peripheral edge. Also included is a heating and cooling mechanism situated in communication with the housing and having a first mode for generating heat for heating contents of the housing and a second mode for absorbing heat for cooling the contents of the housing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a top view of the present invention with the cap in place.

FIG. 3 is a bottom view of the present invention.

FIG. 5 is a perspective view of an adapter for allowing use of the present invention in a vehicle.

DESCRIPTION OF THE PREFERRED EMBODIMENT

Figure 1:
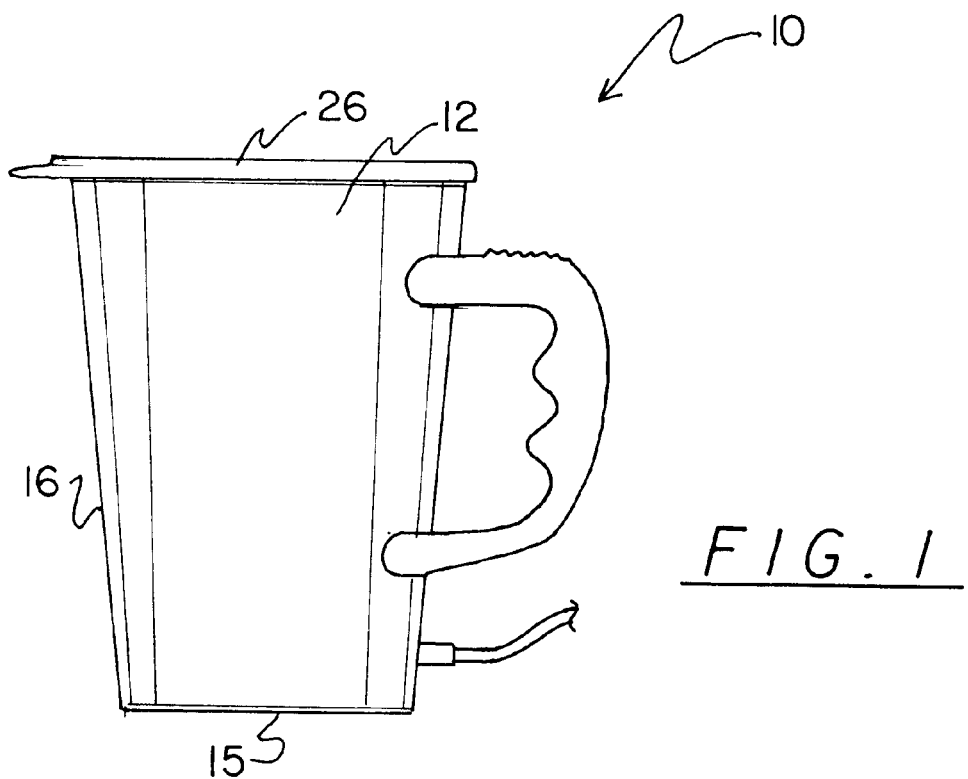
FIG. 1 is a side view of a new travel mug according to the present invention.

With reference now to the drawings, and in particular to FIGS. 1 through 5 thereof, a new travel mug embodying the principles and concepts of the present invention and generally designated by the reference numeral 10 will be described.

Figure 4:
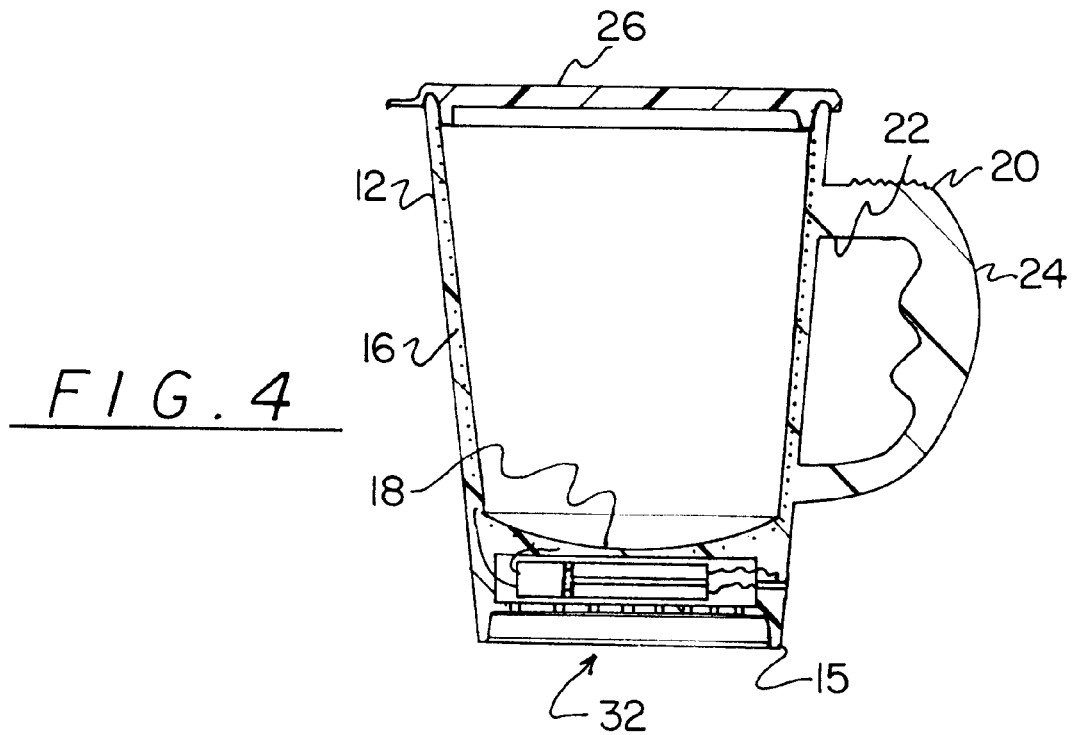
FIG. 4 is a cross-sectional view of the present invention taken along line 4—4 shown in FIG. 2.

The present invention, designated as numeral 10, includes a housing 12 having a circular base 15 with a peripheral side wall 16 integrally coupled to a periphery of the base and extending upwardly therefrom. As such, an interior space and an upper peripheral edge is defined. The housing further includes a horizontally oriented intermediate face 18 mounted to the side wall above and in parallel with the base for defining a hermetically sealed compartment. As shown in FIG. 4, the intermediate face may be equipped with an arcuate top surface.

It should be noted that an interior space of the housing is sized to releasably and fittedly receive a cylindrical can therein. As such, the housing may hold a beverage directly therein or, in the alternative, function as merely a holding device for a can or the like. In either method of use, the objective of the present invention is accomplished.

Further provided is a handle 20 including a pair of horizontally oriented arms 22 integrally coupled to the side wall and extending radially therefrom. A vertical extent 24 of the handle is coupled between outboard ends of the arms. An inner edge of the vertical extent has a plurality of undulations formed therein. A top edge of an upper one of the arms has a plurality of gripping ridges formed therein.

Also included is a cap 26 having a circular planar configuration with a pair of downwardly extending peripheral annular flanges for defining an annular groove. Such groove is adapted for releasably engaging the upper peripheral edge of the housing. A periphery of the cap has a tab integrally coupled thereto and extending radially therefrom for facilitating the removal of the cap from the housing.

The cap has an arcuate slot 28 formed therein adjacent to the periphery thereof. As shown in FIG. 2, the slot spans about 10–15 angular degrees of the cap. A circular breathing aperture 30 is formed adjacent to the periphery on a diametrically opposed portion of the cap with respect to the arcuate slot.

Finally, a heating and cooling means 32 is situated within the compartment of the housing. During use, the heating and cooling means has a first mode for generating heat for heating contents of the housing and a second mode for absorbing heat for cooling the contents of the housing. It is preferred that a switch be employed to selectively determine in which mode the heating and cooling means operates. Note FIG. 5.

To accomplish this, semiconductors may be used to exploit the "peltier effect". In such embodiment, a reversal of current flow through a specially configured N-type and P-type semiconductor, or a dissimilar wire harness, is employed. Direction of current flow through a junction of the semiconductors, as dictated by the switch, determines heating or cooling by use of thermo-electric refrigeration. As shown in FIG. 4, the semiconductor materials may, as an option, be formed in a thin helical configuration encompassing the entire housing for more effectively controlling the temperature. In the alternative, a miniature working fluid-based dual-mode heat pump may optionally be utilized in lieu of the semiconductors.

In either embodiment, vents are preferably formed in the base of the housing for ventilation purposes. Further, unillustrated fins may be employed to transfer heat to and from the beverage within the housing. Such fins may further be configured to define an interior cylindrical space for affording the aforementioned benefits when a can is inserted within the housing.

While energy may be provided by way of an internal battery, it is preferred that energy be provided via a cigarette lighter power supply 34, as shown in FIG. 5. As such, the present invention is ideally suited for automobile use. As a further option, the housing may merely comprise of a compartment slidably situated within a dash of the automobile for containing a plurality of beverage containers therein. Ideally, in the present embodiment, the housing is easily cleaned, powered by the vehicle and has a fuse for protection purposes.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A heated and cooled beverage container comprising, in combination:

a housing including a circular base having a peripheral side wall integrally coupled to a periphery of the base and extending upwardly therefrom for defining an interior space and an upper peripheral edge, the housing further including a horizontally oriented intermediate face mounted to the side wall above and in parallel with the base for defining a compartment, wherein an interior space of the housing is sized to releasably and fittedly receive a cylindrical can therein;

a handle including a pair of horizontally oriented arms integrally coupled to the side wall and extending radially therefrom and a vertical extent coupled between outboard ends of the arms, an inner edge of the vertical extent having a plurality of undulations formed therein, a top edge of an upper one of the arms having a plurality of gripping ridges;

a cap having a circular planar configuration with a pair of downwardly extending peripheral annular flanges for defining an annular groove for releasably engaging the upper peripheral edge of the housing, a periphery of the cap having a tab integrally coupled thereto and extending radially therefrom for facilitating the removal of the cap from the housing, wherein the cap has an arcuate slot formed therein adjacent to the periphery thereof and a circular breathing aperture formed adjacent to the periphery on a diametrically opposed portion of the cap with respect to the arcuate slot; and heating and cooling means situated within the compartment of the housing and having a first mode for generating heat for heating contents of the housing and a second mode for absorbing heat for cooling the contents of the housing.

2. A heated and cooled beverage container comprising:

a housing including a base having a peripheral side wall integrally coupled to a periphery of the base and extending upwardly therefrom for defining an interior space and an upper peripheral edge;

heating and cooling means situated in communication with the housing and having a first mode for generating heat for heating contents of the housing and a second mode for absorbing heat for cooling the contents of the housing; and a handle having a pair of horizontally oriented arms integrally coupled to the side wall and extending radially therefrom and a vertical extent coupled between outboard ends of the arms, an inner edge of the vertical extent having a plurality of undulations formed therein, a top edge of an upper one of the arms having a plurality of gripping ridges.

3. A heated and cooled beverage container comprising:

a housing including a base having a peripheral side wall integrally coupled to a periphery of the base and extending upwardly therefrom for defining an interior space and an upper peripheral edge;

heating and cooling means situated in communication with the housing and having a first mode for generating heat for heating contents of the housing and a second mode for absorbing heat for cooling the contents of the housing; and a cap having a circular planar configuration with a pair of downwardly extending peripheral annular flanges for defining an annular groove for releasably engaging the upper peripheral edge of the housing, a periphery of the cap having a tab integrally coupled thereto and extending radially therefrom for facilitating the removal of the cap from the housing, wherein the cap has an arcuate slot formed therein adjacent to the periphery thereof and a circular breathing aperture formed adjacent to the periphery on a diametrically opposed portion of the cap with respect to the arcuate slot.

4. The heated and cooled beverage container as set forth in claim 2 wherein the housing has a generally cylindrical configuration.

5. The heated and cooled beverage container as set forth in claim 2 and further including a horizontally oriented intermediate face mounted to the side wall above and in parallel with the base for defining a lower compartment for housing the heating and cooling means.

6. The heated and cooled beverage container as set forth in claim 2 wherein an interior space of the housing is sized to releasably and fittedly receive a cylindrical can therein.

7. The heated and cooled beverage container as set forth in claim 3 wherein the housing has a generally cylindrical configuration.

8. The heated and cooled beverage container as set forth in claim 3 and further including a horizontally oriented intermediate face mounted to the side wall above and in parallel with the base for defining a lower compartment for housing the heating and cooling means.

9. The heated and cooled beverage container as set forth in claim 3 wherein an interior space of the housing is sized to releasably and fittedly receive a cylindrical can therein.

* * * * *